(12) United States Patent
Lewis et al.

(10) Patent No.: US 8,818,315 B2
(45) Date of Patent: *Aug. 26, 2014

(54) METHOD, SYSTEM, AND COMPUTER PROGRAM PRODUCT FOR OPTIMIZING SIGNAL QUALITY OF A COMPOSITE RECEIVED SIGNAL

(71) Applicant: AT&T Mobility II LLC, Atlanta, GA (US)

(72) Inventors: John E. Lewis, Lawrenceville, GA (US); Melvin D. Frerking, Eastman, GA (US); David G. Shively, Smyrna, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/865,681

(22) Filed: Apr. 18, 2013

(65) Prior Publication Data

US 2013/0237168 A1 Sep. 12, 2013

Related U.S. Application Data

(63) Continuation of application No. 12/638,269, filed on Dec. 15, 2009, now Pat. No. 8,442,469.

(51) Int. Cl.
*H04B 1/06* (2006.01)
*H01Q 21/06* (2006.01)
*H04J 3/06* (2006.01)

(52) U.S. Cl.
USPC ............... 455/276.1; 455/67.16; 455/304; 455/135; 455/161.3; 370/516; 342/361

(58) Field of Classification Search
USPC ........ 455/135, 161.3, 277.2, 421, 452.2, 513, 455/67.16, 276.1, 304; 342/154, 357.26, 342/360–366, 188; 370/215, 516
See application file for complete search history.

(56) References Cited

U.S. PATENT DOCUMENTS

| | | |
|---|---|---|
| 4,737,793 A | 4/1988 | Munson et al. |
| 5,659,322 A | 8/1997 | Caille |
| 5,784,033 A | 7/1998 | Boldissar, Jr. |
| 6,300,900 B1 | 10/2001 | Bleret et al. |
| 7,519,030 B2 | 4/2009 | Cimini et al. |
| 8,098,612 B2 | 1/2012 | Chang |
| 2001/0002919 A1 | 6/2001 | Sourour et al. |
| 2004/0051677 A1 | 3/2004 | Gotti |
| 2004/0266360 A1 | 12/2004 | Hamalainen et al. |
| 2005/0031341 A1 | 2/2005 | Stuart |
| 2006/0073802 A1 | 4/2006 | Chari et al. |
| 2007/0142014 A1 | 6/2007 | Wilcox |
| 2009/0182235 A1 | 7/2009 | Robert et al. |

(Continued)

OTHER PUBLICATIONS

Antenna Polarization—www.antenna-theory.com/basics/antennapot.php, 2pp (Printed Nov. 25, 2009).

(Continued)

*Primary Examiner* — Dominic E Rego

(74) *Attorney, Agent, or Firm* — Parks IP Law LLC

(57) ABSTRACT

Signal quality of a composite received signal in a radio communication network is optimized by adjusting a phase offset between received and/or transmitted signals based on signal quality parameters of the received and/or transmitted signals. The phase offset is adjusted by varying the phase offset between the received or transmitted signals such that that the composite signal is circularly, elliptically, or linearly polarized. The phase offset between the received or transmitted signals is continually adjusted based on the received signal quality parameters.

20 Claims, 4 Drawing Sheets

(56) References Cited

U.S. PATENT DOCUMENTS

| | | |
|---|---|---|
| 2009/0190684 A1 | 7/2009 | She et al. |
| 2010/0008400 A1 | 1/2010 | Chari |
| 2010/0054205 A1 | 3/2010 | Kalhan |
| 2010/0144337 A1 | 6/2010 | Dean |
| 2010/0150013 A1 | 6/2010 | Hara et al. |

OTHER PUBLICATIONS

Polarization—www.antenna-theory.com/basics/polarization.php, 5pp (Printed Nov. 25, 2009).

METHOD, SYSTEM, AND COMPUTER PROGRAM PRODUCT FOR OPTIMIZING SIGNAL QUALITY OF A COMPOSITE RECEIVED SIGNAL

TECHNICAL FIELD

The present disclosure relates generally to communication systems, methods, computer program products for optimizing signal quality and, more particularly, to varying a phase offset between transmit signals and also received signals to optimize signal quality.

BACKGROUND

In a radio communication network, for a transmitting antenna in, e.g., a wireless device, to communicate with a receiving antenna in, e.g., a base station receiver, the receiving antennas need to have the same polarization as the transmitting antennas. As typical antennas in a radio communication network are linearly polarized, signal quality is often degraded as the angle at which a transmitting antenna in a wireless device varies, such that the polarization of the transmitting antenna does not match the polarization of the receiving antenna in the base station (for example, due to multiple reflections, de-polarization, scattering, etc.).

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to an exemplary embodiment, a method for optimizing quality of a composite received signal in a radio communication network includes receiving data representing signal quality parameters of transmitted or received signals and adjusting a phase offset between the transmitted or received signals based on the received data such that the composite signal formed from the transmitted or received signals has an optimized signal quality. The phase offset is adjusted by varying the phase offset between the transmitted or received signals such that the composite signal is circularly, elliptically, or linearly polarized. The phase offset between the transmitted received signals is continually adjusted based on the received data.

According to another embodiment, a system optimizes quality of a composite received signal in a radio communication network. The system includes an input for receiving data representing signal quality parameters of transmitted or received signals and a phase shifter for adjusting a phase offset between the transmitted or received signals based on the received data such that the composite signal formed from the transmitted or received signals has an optimized signal quality. The phase offset is adjusted by varying the phase offset between the transmitted or received signals such that that the composite signal is circularly, elliptically, or linearly polarized. The phase shifter continually adjusts the phase offset between the transmitted or received signals based on the received data.

According to another embodiment, a computer program product having a computer readable medium includes instructions for optimizing quality of a composite received signal in a radio communication system. The instructions, when executed by a processor, cause the processor to receive data representing signal quality parameters of transmitted or received signals and adjust a phase offset between the transmitted received signals based on the received data such that the composite signal formed from the transmitted or received signals has an optimized signal quality. The phase offset is adjusted by varying the phase offset between the transmitted or received signals such that that the composite signal is circularly, elliptically, or linearly polarized. The phase offset between the transmitted or received signals is continually adjusted based on the received data.

DETAILED DESCRIPTION

Detailed exemplary embodiments are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

The polarization of an antenna is the polarization of the radiated fields produced by the antenna. Typical antenna panels in use in today's radio communication networks employ multiple elements vertically aligned. A single dipole vertically oriented would generate a vertical linearly polarized signal. Stacking several dipoles in phase with proper spacing produces gain in the horizontal plane. Two sets of vertical stacked antennas may be used for spatial diversity. This type of antenna is in use, e.g., in cell sites.

Figure 1:
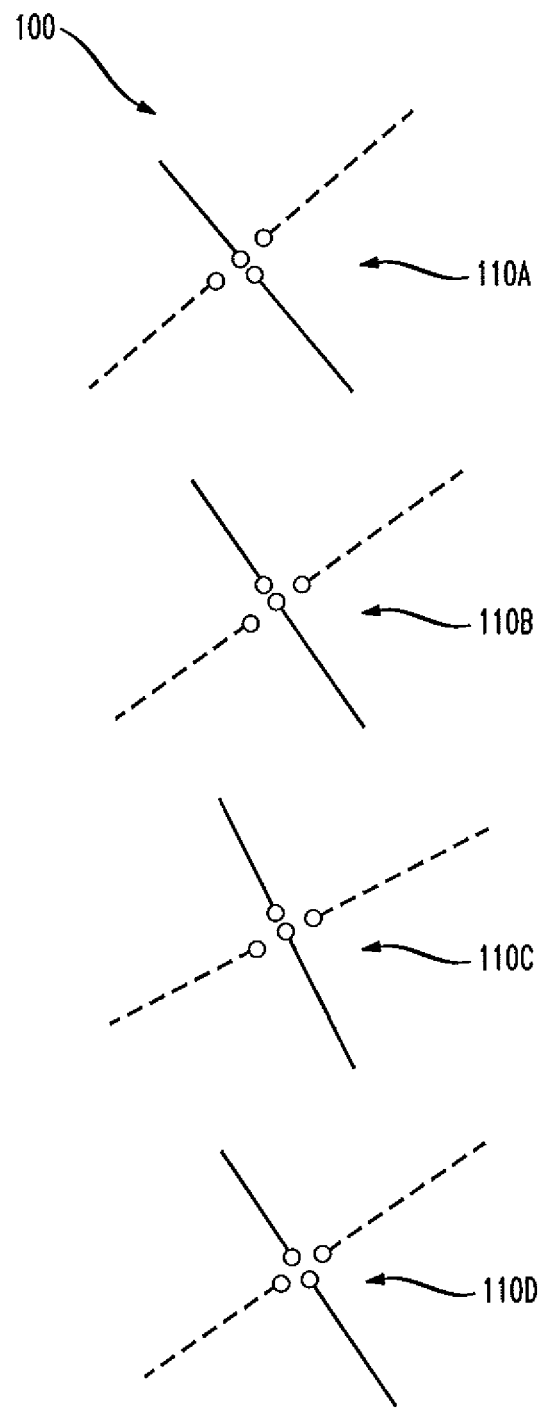
FIG. 1 illustrates a conventional antenna panel arrangement in a radio communication system.

Slant polarization is also in use to generate linearly polarized signals. In this scenario, the dipoles are stacked and offset by ±45°. An example of such an antenna configuration is shown in FIG. 1. Each of the elements 110A, 110B, 110C, 110D in the antenna panel 100 includes multiple dipole elements fed separately. The solid lines represent dipole elements fed in one phase via center feed points, while the dashed lines represent dipole elements fed separately in another phase via center feed points. The offset polarized antennas do no interact with each other and it is thus possible to locate them physically together. The signals produced by such an antenna are linearly polarized at +45° and −45°. Multiple elements 110A, 110B, 110C, 110D vertically fed with proper vertical spacing produce a linearly polarized signal with reinforcement in the horizontal plane and signal cancellation in the off-horizontal plane and vertical plane.

Figure 2:
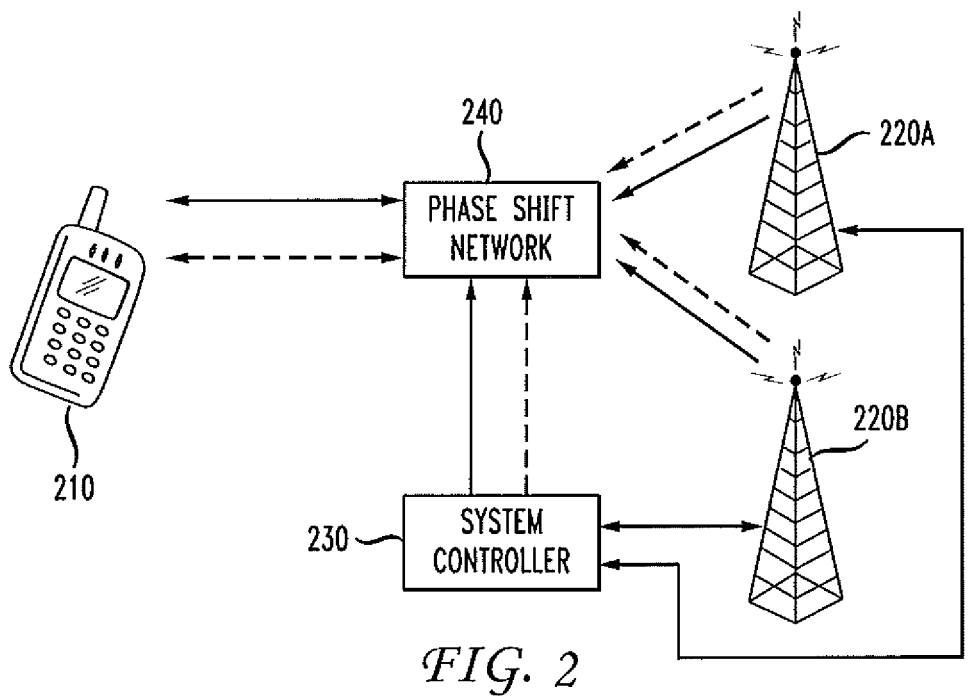
FIG. 2 illustrates a radio communication network including a phase shift network according to an exemplary embodiment.

FIG. 2 illustrates a radio communication network including a phase shifting system according to exemplary embodiments. The radio communication system includes one or more wireless devices 210 that communicate via one or more base station receivers 220A, 220B. The wireless device may include, e.g., a cellular telephone, a PDA and/or any other device capable of transmitting and receiving signals in a radio communication network.

According to an exemplary embodiment, the phase shifting system includes a phase shifting network 240 and a system controller 230. Signals transmitted from a wireless device 210 are intercepted by the phase shifting network 240 before they are transmitted to the base station receivers 220A, 220B. The system controller 230 receives information from the base stations receivers 220A, 220B indicating quality of received signals. This information may be generated based on measurement of signal quality parameters, such as signal strength, signal to noise ratio, bit error rate (BER), frame error rate (FER), etc., at the base station receivers 220A, 220B. This information may be obtained by interrogating the receivers 220A, 220B or monitoring quality of signals received at the receivers 220A, 220B. In one embodiment, signal quality measurements may be performed by the base station receivers 220A, 220B after formation of a composite signal by signal combining, e.g., Maximum Ratio Combining (MRC).

Alternatively, information indicating the signal quality of signals transmitted by the wireless device 210 (and intercepted by the phase shifting network 240) may be received by the system controller 230. This information may be obtained based on signal quality measurements performed by the wireless device 210. The signal quality measurements performed by the wireless device 210 may be monitored or the wireless device 210 may be interrogated to obtain this data.

The system controller 230 uses signal quality information to control the phase shifting network 240 to adjust the phase offset between received signals (or transmitted signals) to produce an optimized composite received signal. The system controller 230 instructs the phase shifting network 240 to vary the phase offset based on the received signal quality information. According to one embodiment, the system controller 230 controls the phase shifting network 240 to continually adjust the phase offset such that the composite signal is continually optimized. The system controller 230 may also select fixed phase offset to cause the phase shifting network 240 to adjust phase offsets to produce Right Hand Circularly Polarized (RHCP), Left Hand Circularly Polarized (LHCP), right or left hand elliptically polarized, or linearly polarized composite signals with optimal signal quality.

Figure 3A:
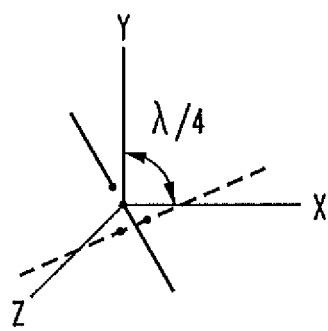
FIGS. 3A. 3B and 3C illustrate antenna arrangements which physically generate circularly polarized signals due to the physical configuration according to an exemplary embodiment.
Figure 3B:
Figure 3C:
Figure 4:
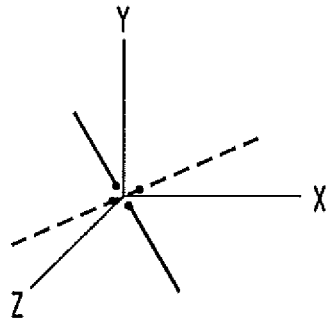
FIG. 4 illustrates an antenna arrangement which electrically generates a circularly polarized signal according to an exemplary embodiment.

According to one embodiment, the phase shifting network 240 adjusts the phase offset using elements such as those shown in FIGS. 3A-4. The phase shifting network may adjust the phase offset between the received (or transmitted) signals to produce a composite signal that is linearly, circularly, or elliptically polarized and thus easier for the base stations receivers 220A, 220B to receive.

According to one embodiment, a linear, circular, or elliptically polarized composite signal is achieved by a physical arrangement of dipole elements. For example, as shown in FIG. 3A, a dipole element along the x-axis and another dipole element along the y-axis may be crossed and offset physically in the z plane by λ/4 separation. Feeding this dipole elements in-phase produces a circularly polarized signal. Varying the offset of the dipoles in the z plane causes the polarization of the resulting signal to vary. Thus, the phase offset of signals (and the polarization achieved) may be adjusted by switching between arrangements of dipole elements configured as shown in FIG. 3A but with different physical offsets in the z plane. The change in physical offsets will change the polarization between circular, linear, and elliptical.

According to another embodiment, spiral elements may be used to generate a composite signal with circular, linear, or elliptical polarization. This is illustrated in FIGS. 3B and 3C which depict spiral elements for RHCP and LHCP, respectively. As shown in FIGS. 3B and 3C, the spiral elements are fed in the center. The spiral elements are, in effect, circularly wrapped dipole elements. The spiral elements may either be in the same plane or spiral into the z plane. To adjust the phase offset of signals, signals may be fed to one of the spiral elements (e.g., the RHCP element to circular polarization), then to another element (e.g., the LHCP element achieve circular polarization) or to both elements (achieving linear polarization). Elliptical polarization may be achieved as the signals are switched from one element to another.

According to another embodiment, circular, linear, and elliptical polarization may be generated electrically. To achieve this, dipoles may be crossed in the same planes but fed from the center with signals that are offset by λ/4, resulting in a circular polarized signal. An example of such an arrangement is shown in FIG. 4. In this scenario, varying the phase offset of the signal fed to the dipole varies the polarization of the resulting signal. As the phase offset is adjusted, the resulting polarization changes from linear (0 degree offset) to elliptical (greater than 0 degree but less than 90 degrees) to circular (±90 degree offset). Thus, by varying the phase from −90° through 0° to +90° results in signals that are RHCP, linear, and LHCP, with the signal being elliptically polarized at phase offsets in between. As this embodiment does not involve switching between antenna elements, it may be preferable.

Circular and elliptical polarized signals may be received by a linearly polarized receiver. The receiver will simply pick up the in phase components of the circularly or elliptically polarized signal. Thus, shifting the phase offsets of signals from a wireless device, which are typically linearly polarized, may improve quality of the received signal.

It should be appreciated that FIGS. 3A-4 each show single antenna elements for ease of illustration. According to an exemplary embodiment, many such elements maybe stacked vertically to generate gain in a horizontal plane, e.g., at a cell site.

Figure 5:
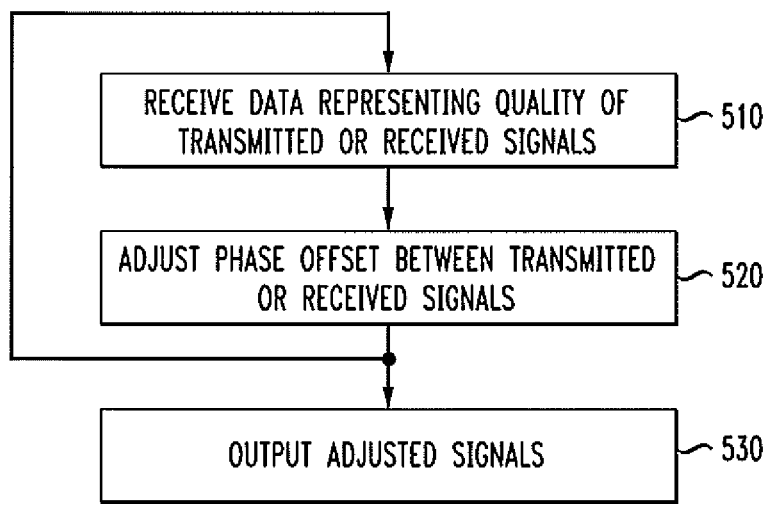
FIG. 5 illustrates a process for adjusting a phase offset to produce a composite having optimal signal quality according to an exemplary embodiment.

FIG. 5 illustrates a process for optimizing quality of received signals according to an exemplary embodiment. At step 510, data representing quality of received signals is received, e.g., at a system controller. At step 520, the phase offset between received signals is adjusted, e.g., by the phase shifting network 240 under control of the system controller 240, such that the composite signal formed from the received signals is linearly, elliptically, or circularly polarized. The adjusted received signals are output, e.g., to the base station receivers, at step 540. The method returns to step 510, and the process is repeated such that the phase offset between received signals is continually adjusted to optimize the quality of the composite received signal.

Figure 6:
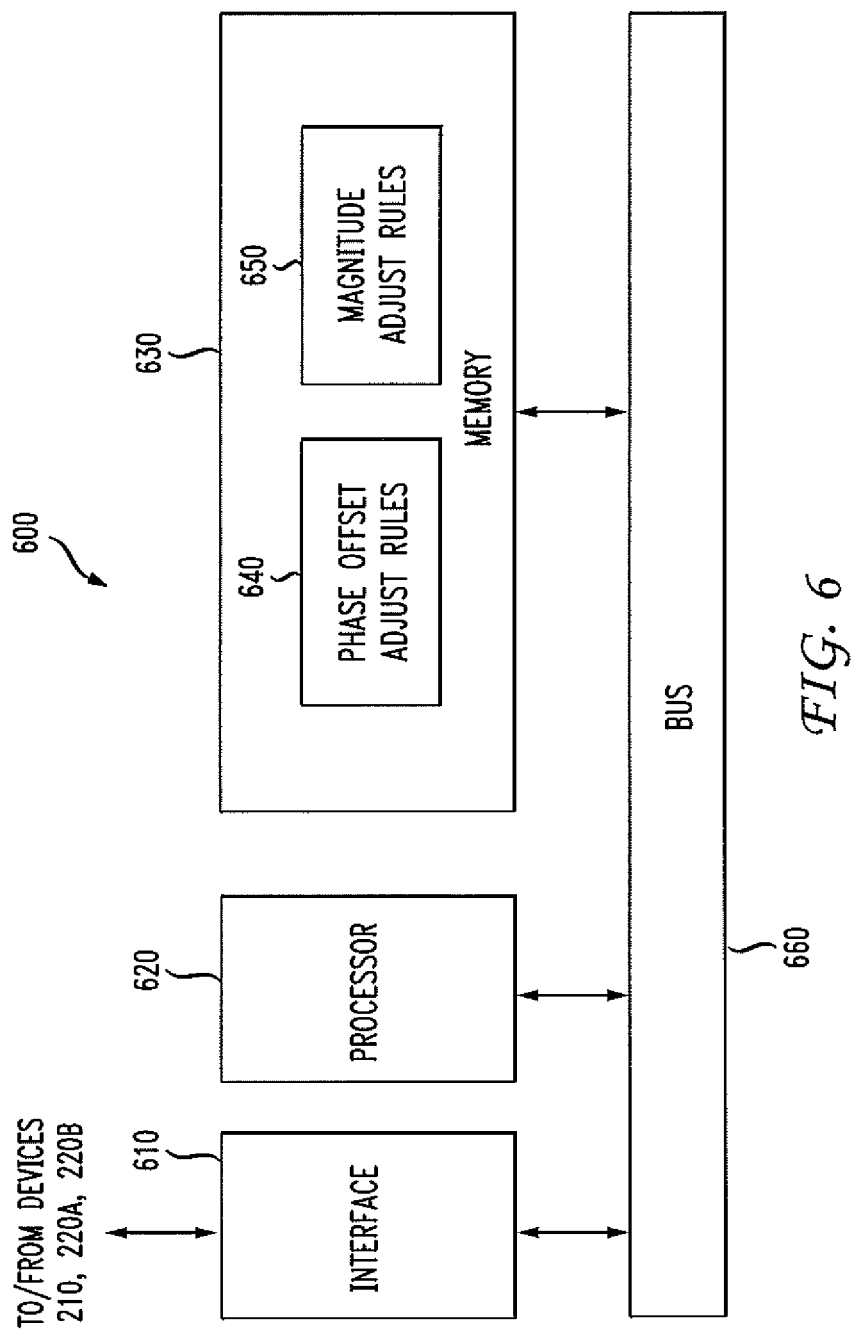
FIG. 6 illustrates a system for optimizing quality of a composite received signal according to an exemplary embodiment.

FIG. 6 illustrates a system for optimizing quality of received signals according to an exemplary embodiment. The system shown in FIG. 6 may be used in place of the phase shifting network 230 and system controller 240 shown in FIG. 2 and may be implemented in between the transmitter 210 and base station receivers 220A, 220B and/or in the base station receiver 220A, 220B, such that phase offset adjustment is performed digitally, e.g., after receiver demodulation. The system 600 can include a combination of hardware and software and can exist as a node on a network, such as a radio communication network. The system 600 includes a network interface 610 that is operatively linked and in communication with one or more processors 620 via one or more data/memory busses 660. The network interface 610 can be used to allow the system to communicate with one or more components of the system, e.g., wireless device 210 and base station receivers 220A, 220B. The processor 620 is operatively linked and in communication with a memory 630 via the data/memory bus 660.

The word "memory," as used herein to describe the memory, collectively includes all memory types associated with the device 600 such as, but not limited to, processor registers, processor cache, random access memory (RAM), other volatile memory forms, and non-volatile, semi-permanent or permanent memory types; for example, tape-based media, optical media, solid state media, hard disks, combinations thereof, and the like. While the memory 630 is illustrated as residing proximate the processor 620, it should be understood that the memory 630 can be a remotely accessed storage system, for example, a server on the radio communication network, a remote hard disk drive, a removable storage medium, combinations thereof, and the like. Moreover, the memory 630 is intended to encompass network memory and/or other storage devices in wired or wireless communication with the device 600, which may utilize the network interface 610 to facilitate such communication. Thus, any of the rules, data, applications, and/or software described below can be stored within the memory 630 and/or accessed via network connections to other data processing systems (not shown) that may include a local area network (LAN), a metropolitan area network (MAN), or a wide area network (WAN), for example. It should be appreciated that the memory 630 can also be a storage device associated with the device 610. The illustrated memory 630 can include one or more provisioning rules phase offset adjusting rules 640 and magnitude adjusting rules 650.

It is contemplated that the system 600 can be configured to store applications to perform steps of the methods described herein below. Applications can include, for example, programs, routines, subroutines, algorithms, software, tools, and the like.

Although not illustrated in the interest of brevity, it should be appreciated that the system controller 240 depicted in FIG. 2 may be implemented with a system including a network interface, a processor, and a memory, similar to that shown in FIG. 6.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, comprising:
   obtaining data representing signal quality parameters of received signals; and
   continually adjusting, by a processor, a phase offset of the received signals based on the obtained data such that a composite signal, formed from the received signals, has an optimized signal quality, wherein in adjusting the phase offset, a polarization of the composite signal is continually adjusted between circular polarization, elliptical polarization, and linear polarization.

2. The method of claim 1, further comprising transmitting adjusted signals to a base station receiver.

3. The method of claim 1, wherein the composite signal is formed at a base station receiver.

4. The method of claim 1, wherein the phase offset is adjusted at a base station receiver.

5. The method of claim 1, wherein the data representing signal quality parameters is obtained by interrogating a base station receiver or a wireless transmission device.

6. The method of claim 1, wherein the data representing the signal quality parameters is obtained by monitoring signal quality of data received by a base station receiver.

7. The method of claim 1, wherein the data representing the signal quality parameters is obtained by monitoring signal quality of data transmitted by a wireless device.

8. A system, comprising:
   a processor; and
   a memory containing instructions encoded thereon, which, when executed by a processor, cause the processor to perform operations comprising:
      obtaining data representing signal quality parameters of received signals; and
      continually adjusting a phase offset of the received signals based on the obtained data such that a composite signal, formed from the received signals, has an optimized signal quality, wherein in adjusting the phase offset, a polarization of the composite signal is continually adjusted between circular polarization, elliptical polarization, and linear polarization.

9. The system of claim 8, wherein the memory further contains instructions, which, when executed by the processor, cause the processor to initiate transmission of adjusted signals to a base station receiver.

10. The system of claim 8, wherein the composite signal is formed at a base station receiver.

11. The system of claim 8, wherein the system is included in a base station receiver.

12. The system of claim 8, wherein the memory further contains instructions which, when executed by the processor, cause the processor to interrogate a base station receiver or a wireless transmission device to obtain the data representing the signal quality parameters.

13. The system of claim 8, wherein the memory further contains instructions which, when executed by the processor, cause the processor to monitor signal quality of data received by a base station receiver to obtain the data representing the signal quality parameters.

14. The system of claim 8, wherein the memory further contains instructions which, when executed by the processor, cause the processor to monitor signal quality of data transmitted by a wireless device to obtain the data representing the signal quality parameters.

15. A computer readable storage device, having instructions encoded thereon, which, when executed by a processor, cause the processor to perform operations comprising:
   obtaining data representing signal quality parameters of received signals; and
   continually adjusting a phase offset of the received signals based on the obtained data such that a composite signal, formed from the received signals, has an optimized signal quality, wherein in adjusting the phase offset, a polarization of the composite signal is continually adjusted between circular polarization, elliptical polarization, and linear polarization.

16. The computer readable storage device of claim 15, further having instructions encoded thereon which, when executed by the processor, cause the processor to initiate transmission of adjusted signals to a base station receiver.

17. The computer readable storage device of claim 15, wherein the composite signal is formed at a base station receiver.

18. The computer readable storage device of claim 15, wherein the computer readable storage device is included in a base station receiver.

19. The computer readable storage device of claim 15, further having instructions encoded thereon which, when executed by the processor, cause the processor to interrogate a base station receiver or a wireless device to obtain the data representing the signal quality parameters.

20. The computer readable storage device of claim 15, further having instructions encoded thereon which, when executed by the processor, cause the processor to monitor signal quality of data received by a base station receiver or signal quality of data transmitted by a wireless device to obtain the data representing the signal quality parameters.

* * * * *